United States Patent Office 2,729,299
Patented Jan. 3, 1956

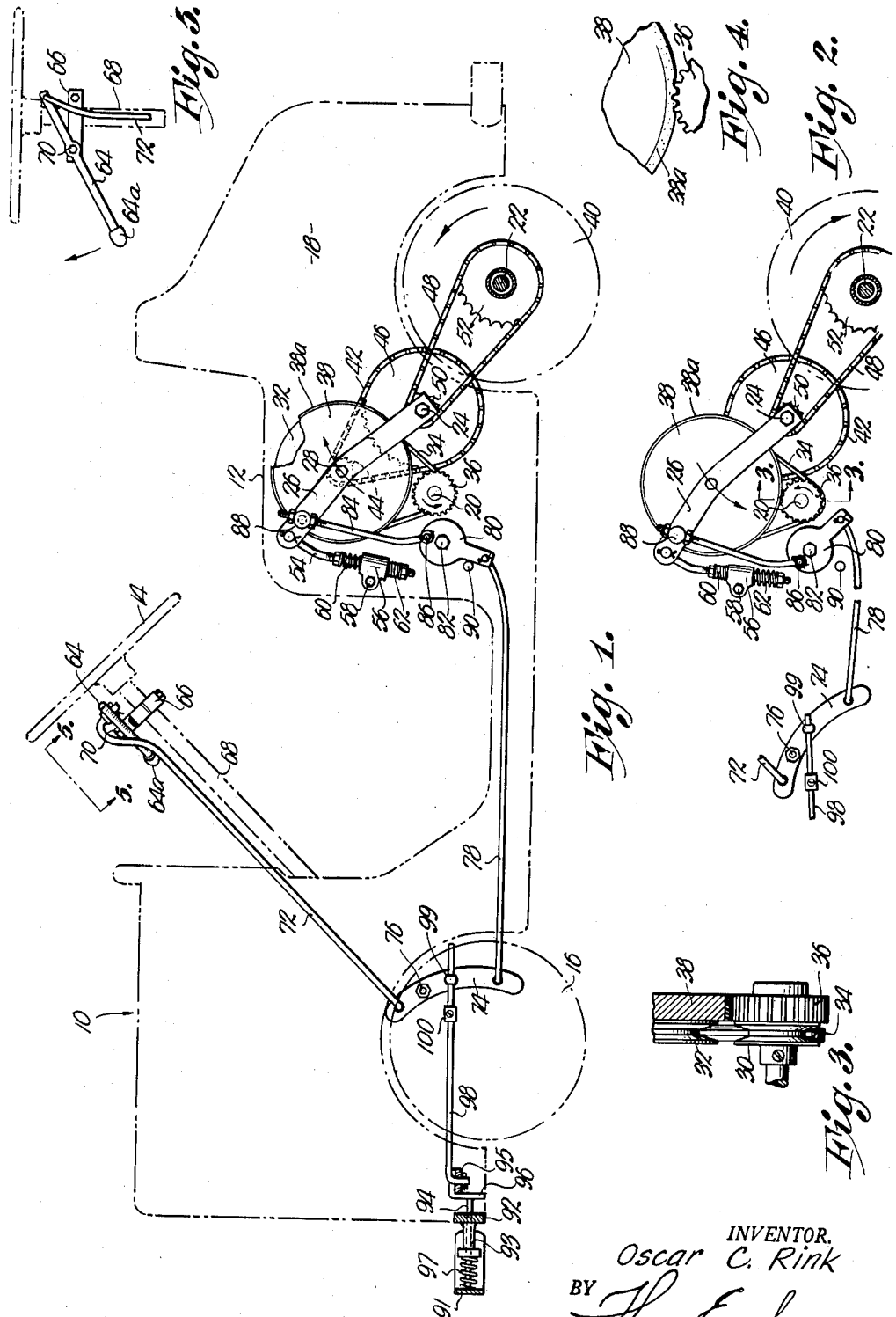

2,729,299

VEHICLE POWER TRANSMISSION AND CONTROL THEREFOR

Oscar C. Rink, Liberty, Mo., assignor to Small Cars, Inc., Kansas City, Mo., a corporation of Missouri Application March 10, 1952, Serial No. 275,738

4 Claims. (Cl. 180—83)

The present invention relates in general to automotive vehicles, and it deals more particularly with a small self-propelled relatively low-speed passenger vehicle capable of being safely driven by children.

An object of the invention is to provide a combined clutch and power transmission operable to start, stop or reverse the travel of the vehicle at will, which mechanism is uncomplicated and economical to construct, yet smooth, foolproof and very efficient in operation—a sturdy, durable mechanism capable of giving long trouble-free service, even in the hands of an inexperienced child as the operator.

Another object is to provide, in conjunction with the aforementioned forward-and-reverse power transmision, an improved manual control system therefor which is simple, safe and reliable, requiring little or no skill on the part of the operator. A feature of the invention resides in the provision of a self-energizing action which assists the operator shift into forward and reverse, thus minimizing the manual effort that must be expended.

Still another object is to provide mechanism for automatically throwing the power transmission train into "neutral" or non-propelling condition upon impact of the vehicle with an obstacle in its path, thereby to remove driving power from the road wheels without stalling the prime mover or imposing strain on either the prime mover or any part of the power transmission train between it and the wheels.

A further feature of the invention resides in the fact that the foregoing automatic uncoupling mechanism is integrated with the manual control system in such a way that when the vehicle has been halted by impact with an obstacle, it can immediately be reversed by the manual control system to withdraw from the obstacle under its own power.

Additional objects and features will appear in the course of the following description of the invention.

In the accompanying drawings which form a part of the specification and are to be read in conjunction therewith, and in which like reference numerals are employed to indicate like parts of the various views:

Fig. 1 is a schematic view of a small passenger vehicle embodying the invention, the parts of the power transmission train being shown in the position they occupy when the vehicle is being driven in a forward direction, Fig. 2 is a fragmentary view corresponding to Fig. 1, but showing the parts of the power transmission train in the position occupied when the vehicle is being driven rearwardly, Fig. 3 is an enlarged cross section taken along the line 3—3 of Fig. 2, Fig. 4 is a fragmentary elevational detail of the engaging portions of the tractive friction wheels shown in Fig. 3, and Fig. 5 is a detail view of the shift control lever, taken in the direction indicated by the arrows 5—5 in Fig. 1.

Referring more particularly to Fig. 1, the vehicle 10 shown in dot-and-dash outline preferably is of a size to accommodate one or two children (or a single adult with not more than one small child) sitting on the seat 12. A steering wheel 14 is coupled with the front road wheels 16 in conventional fashion for steering purposes, these details having been omitted, however, for the sake of simplicity, since they form no part of the present invention. The vehicle chassis likewise has been omitted, but serves as a support for certain elements of my mechanism as will be made clear hereinafter.

Below the seat and within the compartment 18 spaced rearwardly thereof is all the essential mechanism for propelling the vehicle both forwardly and rearwardly. This includes a prime mover (not shown) which most conveniently is a small two-cycle or four-cycle gasoline engine fixedly mounted on the vehicle chassis and having a drive shaft 20 always turning counterclockwise as indicated by the arrow.

This shaft is spaced forwardly of the rear axle 22, and intermediate the two is another shaft 24 carried in fixed relation to the chassis by suitable bearings whereby it will be understood that shafts 20 and 24 and axle 22 have their axes fixedly oriented relative to one another (and relative to the vehicle proper) in the positions shown.

Swingably mounted to turn about the axis of shaft 24 (preferably by means of separate bearings coaxial therewith) is an arm 26 carying a jack shaft 28. Cooperating pulleys 30 and 32 are secured to the drive shaft 20 and jack shaft 28 respectively such that upon upward movement of the free end of arm 26 (see Fig. 1), belt 34 is drawn taut between the pulleys, causing the jack shaft to be driven counterclockwise. Beside the pulleys on the respective shafts are a pair of tractive friction wheels 36 and 38 whose margins are spaced apart as shown in Fig. 1 when the belt is drawn taut; however, upon downward movement of the free end of arm 26 (see Fig. 2), the belt not only is loosened and rendered ineffective but wheels 36 and 38 are brought forcibly into peripheral engagement so that the jack shaft is driven in a clockwise direction.

Upon being thus driven in either direction, the rotation of jack shaft 28 is transmitted to the rear ground wheels 40 through the medium of a two-stage speed-reducing chain drive, comprising a chain 42 connectingt he sprockets 44 and 46 on shafts 28 and 24 respectively; and a second chain 48 connecting sprockets 50 and 52. Accordingly wheels 40 always turn in the same direction as the jack shaft, their rotation being such as to produce forward movement of the vehicle when the free end of arm 26 is raised as in Fig. 1 and rearward movement of the vehicle when the free end of the arm is drawn downwardly as in Fig. 2. Between these two positions jack shaft 28 and sprocket 44 necessarily travel in an arc concentric with the axis of sprocket 46, and since they always remain at the same distance from the latter axis, it will be obvious that the chain drive between these two sprockest always is equally effective in all positions of the arm.

Hinged to the free end of arm 26 is a rod 54 which is freely slidable in sleeve 56, the latter being pivoted to the chassis or body at 58. Coiled compression springs 60 and 62 encircle the rod on either side of the sleeve and bear against retaining nuts on the rod, as illustrated. Thus when arm 26 is in its uppermost position, the lower spring 62 is compressed as shown in Fig. 1, and when the arm is in its lowermost position, the upper spring 60 is compressed as shown in Fig. 2. Together, these two springs comprise a yieldable centering arrangement tending to maintain the arm 26 in a neutral position midway between the end positions shown in Figs. 1 and 2; when in this neutral position, friction wheels 36 and 38 are not in engagement, and belt 34 likewise is not tight, so rotation of the drive shaft 20 is not imparted to the jack shaft 28 and the vehicle remains motionless.

Movement of arm 26 up or down from neutral to produce forward or rearward motion of the vehicle is controlled by a shift lever 64 which is mounted on a bracket 66 clamped to the steering post 68. Pivoted to the bracket at 70, the lever projects laterally from the steering post and terminates in a knob or hand grip 64a the other end has hingedly connected to it a thrust rod 72 which extends downwardly along the upper side of the steering post and acts on a rocker arm 74 pivoted to the chassis at 76. The latter is linked by a thrust rod 78 to a crank member 80 pivoted to the chassis at 82 so that clockwise movement of the rocker arm produces clockwise movement of the crank member and vice versa. Thus, it will be seen that when the manual control knob 64a is moved upwardly as indicated by the arrow in Fig. 5, rod 72 moves downwardly relative to the steering post, turning rocker arm 74 counterclockwise about the pivot 76 from its Fig. 1 position to its Fig. 2 position and producing a corresponding rotation of the crank 80 about its pivot 82.

A link 84 connects crank 80 to arm 26, being pivoted to the former at 86 and to the latter at 88. As will be clear from Fig. 2, when the crank 80 is turned counterclockwise under control of the shift lever, it causes link 84 to exert a downward thrust on arm 26, bringing the friction wheel 38 into forcible engagement with wheel 36 and causing rearward movement of the vehicle. Such movement will continue as long as the operator forcibly draws the manual control knob upwardly (i. e., toward himself), but when the force is released, spring 60 restores the arm 26 and shift lever 64 to neutral, halting the vehicle as described hereinbefore.

When the manual control knob 64a is pushed downwardly (i. e., away from the operator), crank 80 is turned clockwise as shown at Fig. 1, causing link 64 to exert an upward thrust on arm 26, thus tightening belt 34 and causing the vehicle to move forwardly. On such rotation of crank 80, it will be seen that pivot 86 passes over center with respect to a line drawn between pivots 82 and 88, the crank being prevented from going beyond this position by a fixed stop 90; accordingly, the parts will not automatically return to "neutral" upon release of the downward force applied to the manual control knob 64a, but instead will remain as shown in Fig. 1 until the operator forcibly shifts the control knob 64a upwardly. (This, of course, means that once the transmission has been shifted into "forward," the vehicle will continue to travel in that direction even though the operator removes his hand from the control lever, but it still can be halted at will by manual restoration of the lever to "neutral"; contrariwise, the lever and power transmission are self-restoring from "reverse" position so the vehicle will travel rearwardly only so long as the operator continues to exert on the control knob 64a a force directed upwardly or toward himself.)

In carrying out the shifting operation, it will be apparent that crank 80 and link 84 actually function as a two-part toggle acting between pivots 82 and 88. Clockwise rotation of the crank has the effect of straightening the toggle and thus forcing pivot 88 away from the fixed pivot 82, the maximum displacement occurring when the toggle is approximately straight and pivots 82, 86 and 88 therefore are approximately aligned, as shown in Fig. 1; counterclockwise rotation of crank 80, on the other hand, has the effect of folding the toggle and thus drawing pivot 88 toward the fixed pivot 82, as shown in Fig. 2. When the transmission is in "neutral" the toggle is partially folded. Further folding thereof under control of the manual shift lever 64 produces reverse travel of the vehicle while straightening thereof produces forward travel, the toggle being constructed to lock only in straightened condition when pivot 86 passes slightly over center as has been described.

If while traveling forwardly the vehicle should collide with an obstacle in its path, the toggle is automatically unlocked and partially folded under control of the bumper 91, causing arm 26 to restore to "neutral" so that driving power is removed from the ground wheels 40. The support for the bumper comprises a frame member 92 having a pair of laterally spaced horizontal sleeves 93 secured thereto. Rods 94 slidably received in the sleeves have the bumper secured to their forward ends and a crosspiece 95 secured to their rear ends by means of brackets 96. Upon impact with an obstacle, the bumper obviously is adapted to yield rearwardly against the tension of coiled biasing springs 97 which encircle the rods 94, and this of course displaces the crosspiece 95 rearwardly. A longitudinally disposed thrust rod 98 extends horizontally from the crosspiece 95 with its rear end loosely received in an eye 99 carried by the rocker arm 74, a collar 100 being secured to the rod by a set screw at a point ahead of the eye. This arrangement does not in any way interfere with the normal operation of the rocker arm under control of the shift lever 64, but upon collision of the vehicle with an obstacle, the rearward movement of the bumper causes collar 100 to strike eye 99, turning the rocker arm counterclockwise; consequently, crank 80 also is turned counterclockwise, whereupon pivot 86 passes over center and springs 60 and 62 cause the arm 26 to be centered in neutral position. This, of course, interrupts the power transmission train so that halting of the vehicle does not stall the prime mover, and shaft 20 therefore continues to turn without having any propelling effect on the vehicle and without imposing any strain either on the prime mover or the power transmission train.

By drawing the manual control knob 64a toward himself, as shown by the arrow in Fig. 5, the operator may immediately shift the transmission train into "reverse" (see Fig. 2) and cause the vehicle to back away from the obstacle under its own power.

In connection with the rearward movement of the vehicle, an important feature of the invention resides in the specific construction of the tractive friction wheels 36 and 38. The former has a serrated periphery and conveniently can take the form of a spur gear althrough other types of teeth or projections about the periphery also will function satisfactorily. The mating friction wheel 38 has a rim or tire of resilient rubber-like material 38a (which may be internally reinforced with cord if desired) bonded to its periphery so that when the two wheels are brought into forcible engagement the teeth or projections on the drive wheel 36 indent the engaging portion of the margin of wheel 38 to take a firm grip thereon. In effect, then, the drive wheel 36 continuously "makes its own track" on wheel 38, the firmness of the grip between the two being controlled by the force with which they are brought together. In practice, slippage between the two wheels can be completely eliminated with but little effort on the part of the operator, and it is easily possible to back the vehicle up very steep grades or to haul loads many times exceeding the weight of the vehicle and its occupants. At the same time, shifting into reverse is carried out smoothly and quietly without clashing of gears, without jerking and without subjecting the parts to undue strain or wear.

Shifting into "forward" is of course carried out with equal smoothness, inasmuch as belt 34 on being tightened takes hold on the pulleys 30 and 32 gradually. As pulley 32 begins to turn (counterclockwise, Fig. 1), it causes sprocket 34 to draw the upper run of chain 42 taut, and in this fashion begins to turn sprocket 46 counterclockwise, rotation of the latter being resisted however due to the inertia of the vehicle, as well as the frictional resistance which must be overcome in order to put the vehicle into motion. Having in mind the resistance of sprocket 46 to rotation, it will be clear that sprocket 44 acting on chain 42 produces a torque which tends to advance arm 26 clockwise about pivot 24. This serves to augment the upward thrust exerted on arm 26 by the operator through the medium of the manual shift lever 64 and thus assists in tightening belt 34; in other words, it results in a self-energizing type of action which reduces the amount of effort the operator is required to use to tighten the belt 34 in the course of shifting into "forward."

Similarly, when in the course of shifting into "reverse" the friction wheel 38 is brought into engagement with wheel 36, sprocket 44 is turned clockwise; again having in mind the resistance of sprocket 46 to rotation, it will be evident that sprocket 44 acting on chain 42 produces a torque tending to move arm 26 downwardly about pivot 24 which serves to increase the force with which the resilient rim 38a of wheel 38 bears against the teeth of wheel 36. As previously suggested, this insures firm tractive engagement between the friction wheels 36 and 38 without requiring the operator to apply excessive force to the manual shift lever 64.

From the foregoing, it will be seen that this invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as various possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. Reversible power transmission apparatus comprising a power operated driving shaft always rotating in a predetermined direction, a driven shaft parallel to and spaced laterally from the driving shaft, a load connected to said driven shaft and resisting rotation of same in either direction, an arm mounted to swing about the axis of the driven shaft and carrying a jack shaft at a fixed distance from the driven shaft whereby said jack shaft is adapted to move in an arc about the driven shaft and toward and away from said driving shaft upon swinging of the arm, a drive connection operatively linking said jack shaft and said driven shaft in all positions of the arm, belt-connected pulleys on said driving shaft and jack shaft respectively whereby movement of the jack shaft away from the driving shaft is effective to tighten the belt and cause rotation of the jack shaft in one direction, a pair of cooperating drive wheels on the jack shaft and driving shaft respectively positioned for peripheral engagement upon movement of the jack shaft toward the drive shaft thereby to cause rotation of the jack shaft in the opposite direction, spring means connected to said arm and always urging same toward a neutral position intermediate said belt-tightening position and said wheel-engaging position, a toggle having one end hinged to said arm and the other end hinged to turn about a fixed center, said toggle being partially folded when said arm is intermediate said last two positions whereby further folding of the toggle moves said arm toward one of said last positions and straightening of the toggle moves the arm toward the other one of said last position, and means for releasably locking the toggle in substantially straightened condition.

2. In a wheeled vehicle, a power operated driving shaft always rotating in a predetermined direction, a driven shaft spaced laterally from the driving shaft and operatively connected to at least one of the vehicle wheels for turning same, a swingable arm carrying one of said shafts for movement toward and away from the other shaft, a pair of belt-connected pulleys on the respective shafts adapted to be drawn taut between the pulleys upon movement of said one shaft away from the other shaft, thereby to turn the driven shaft in one direction, a pair of cooperating friction wheels on the respective shafts positioned for peripheral engagement with one another upon movement of said one shaft toward the other shaft, thereby to turn the driven shaft in the opposite direction, a crank member pivoted to turn about a fixed center, a link hinged at one end to said crank member and pivoted at the other end to said arm for swinging said arm under control of the crank, manually operable means connected to said crank for turning it in either direction at will, fixed stop means to halt the rotation of the crank in one direction when the hinge between the crank and link is in over-center relation to the line between the crank pivot and the pivot at said other end of the arm, and means including a bumper yieldably mounted on the vehicle and coupled with said crank for turning same in the opposite direction from said over-center position upon impact of the bumper with an obstacle in the path of the vehicle.

3. In a wheeled vehicle, a power transmission mechanism including a movable control member having "forward" and "reverse" positions and a "neutral" position intermediate said first two positions, spring means connected to said member and always urging same toward "neutral" position, a toggle having one end hinged to said member and the other end hinged to turn about a fixed center, said toggle being partially folded when said member is in "neutral" position whereby further folding of the toggle moves said member toward one of said first two positions and straightening of the toggle moves the member toward the other of said first two positions, an over-center stop for releasably locking the toggle in substantially straightened condition, a manually operable lever connected to said toggle for folding and unfolding same, a bumper yieldably mounted on the vehicle, and a thrust element operatively connected to said bumper and said toggle for applying a thrust on the toggle in a direction tending to fold same responsive to yielding of the bumper as a result of impact thereof with an obstacle in the path of the vehicle.

4. A power transmission apparatus comprising a power-operated driving shaft always rotating in a predetermined direction, a driven shaft parallel to and spaced laterally from said driving shaft, an arm mounted to swing about the axis of the driven shaft and carrying a jack shaft at a fixed distance from said driven shaft whereby said jack shaft is adapted to move in an arc about the driven shaft and toward and away from said driving shaft upon swinging of the arm, a drive connection operatively linking said jack shaft and said driven shaft in all positions of the arm, belt-connected pulleys on said driving shaft and jack shaft respectively whereby movement of the jack shaft away from said driving shaft is effective to tighten the belt and cause rotation of said jack shaft in one direction, a load connected with said driven shaft and resisting rotation of same, said jack shaft being so located with respect to said driving shaft that the resistance imposed by said load exerts a torque on said arm in a direction to urge said jack shaft away from said driving shaft to aid in tightening said belt, a pair of cooperating drive wheels on the jack shaft and driving shaft respectively positioned for peripheral engagement upon movement of said jack shaft toward the drive shaft thereby to cause rotation of the jack shaft in the opposite direction, manually operable means for shifting said jack shaft between said belt-tightening position and said wheel-engaging position, and spring means connected to said arm and always urging same toward a neutral position intermediate said positions.

References Cited in the file of this patent

UNITED STATES PATENTS

| | | |
|---|---|---|
| 783,037 | Herby | Feb. 21, 1905 |
| 944,236 | Espe | Dec. 21, 1909 |
| 1,123,538 | Imamura | Jan. 5, 1915 |
| 1,132,665 | Manly | Mar. 23, 1915 |
| 1,306,030 | Stewart | June 10, 1919 |
| 1,428,044 | Martin | Sept. 5, 1922 |
| 1,627,252 | Peters | May 3, 1927 |
| 2,207,447 | Viles et al. | July 9, 1940 |
| 2,445,797 | Moore | July 27, 1948 |
| 2,457,821 | Johnson | Jan. 4, 1949 |

FOREIGN PATENTS

| | | |
|---|---|---|
| 2,904 | Great Britain | 1885 |